Sept. 5, 1944.  R. T. KILLMAN  2,357,477
NURSING BOTTLE WITH TEMPERATURE INDICATOR
Filed May 12, 1943
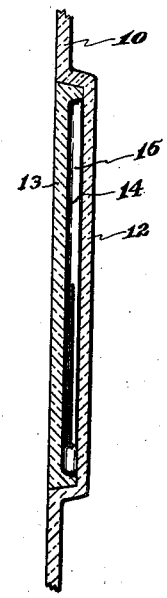
Fig. 2.
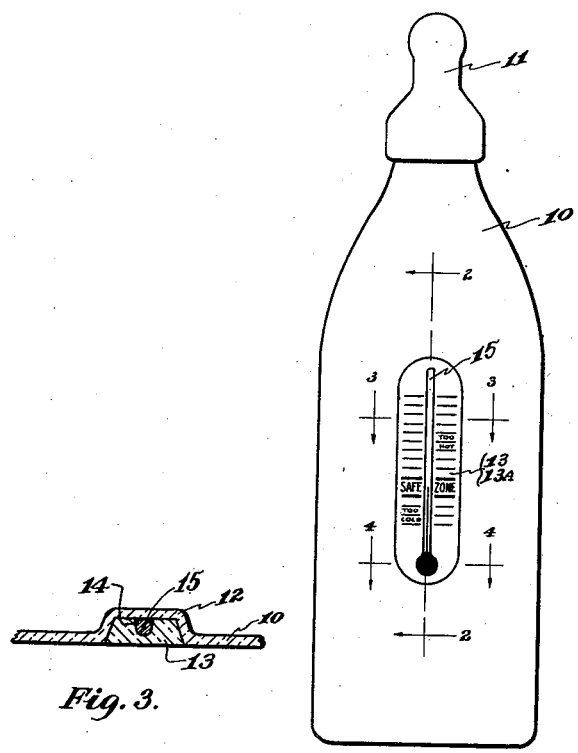
Fig. 1.
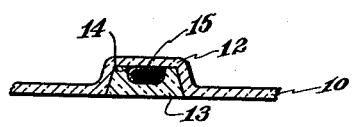
Fig. 3.
Fig. 4.
INVENTOR.
Robert T. Killman Patented Sept. 5, 1944

2,357,477

UNITED STATES PATENT OFFICE 2,357,477

NURSING BOTTLE WITH TEMPERATURE INDICATOR

Robert T. Killman, Nashville, Tenn., assignor to Eisele & Co., Nashville, Tenn., a copartnership Application May 12, 1943, Serial No. 486,649

2 Claims. (Cl. 73—343)

My invention relates to bottles and other containers having temperature indicating means incorporated therein. It particularly relates to infant nursing bottles having a liquid bulb thermometer positioned in one wall thereof and is especially directed to means for positively securing the thermometer in said wall.

I am aware that in the past such bottles have been made and that thermometers have been secured in a depression in the wall thereof by elastic bands, cement and the like.

It is an object of my invention to provide means for retaining such a thermometer in operative position in the wall of such a bottle so that the external surface of the bottle remains smooth and without dirt collecting pockets and recesses. Furthermore the thermometer is retained in proper position relative to its scale, which may be engraved on the bottle wall or other members, without the use of cementitious material upon the thermometer tube which often causes a dirty appearance of the thermometer bulb and stem.

The means by which I accomplish these purposes and others will be more readily understood by referring to the accompanying drawing in which Figure 1 is a front elevation of my invention Figures 2, 3, and 4 are fragmentary sectional views taken along the lines 2—2, 3—3, 4—4 respectively of Figure 1 and illustrate a preferred form of my invention.

Referring now to the drawing and more specifically to Figures 1, 2, 3, and 4 the numeral 10 denotes a nursing bottle of glass carrying at its upper end a rubber nipple 11. Formed in one wall of the bottle 10 is the depression 12 of a shape shown having a flat bottom, sidewalls tapering toward the bottom, and rounded ends. Received into this depression 12 is the retaining member 13 of a form to closely fit the depression 12. Member 13 may be held in depression 12 by any suitable means such as, for example, by a suitable cement.

Formed in the back side of member 13 is the form fitting recess 14 adapted to receive a tubular glass thermometer 15 and recess 14 forms with the bottom wall of depression 12 a chamber entirely enclosing thermometer 15 so that the thermometer is rigidly fixed in position so that it cannot move in any direction. Upon the outer or front surface of member 13 may be placed a suitable scale or other indicia such as, for example, that shown in Figure 1 by which the reading of thermometer 15 may be ascertained.

Having thus described my invention, what I claim as new and desire to secure by Letters Patent, is:

1. In a bottle, a wall having a depression formed therein, a transparent retaining member received in said depression, and having a form fitting recess formed in its inner face, said recess forming with the bottom of said depression a cavity adapted to receive and hold rigidly in position a tubular thermometer, and a thermometer located in said cavity.

2. In a bottle, a wall having a depression formed therein, the side walls defining said depression tapering inwardly toward the bottom thereof, a transparent retaining member having tapered edges mating with the side walls defining said depression and received in said depression, and having a form fitting recess formed in its inner face, said recess forming with the bottom of said depression a cavity adapted to receive and hold rigidly in position a tubular thermometer, and a thermometer located in said cavity.

ROBERT T. KILLMAN.